US012755855B2

(12) United States Patent
DeWitte et al.

(10) Patent No.: US 12,755,855 B2
(45) Date of Patent: Oct. 6, 2026

(54) IN-VESSEL NATURAL CIRCULATION ALKALI METAL REACTOR SYSTEM, PURIFICATION SYSTEM, AND ASSOCIATED METHODS

(71) Applicant: Oklo Inc., Santa Clara, CA (US)

(72) Inventors: Jacob DeWitte, Mountain View, CA (US); Caroline Cochran, Mountain View, CA (US); Alexandra Renner, Silverthorne, CO (US); Patrick Everett, San Francisco, CA (US); Miller Geschke, Los Altos, CA (US); Clyde Huibregtse, San Francisco, CA (US); David Hawn, Houston, TX (US); John Hanson, Sunnyvale, CA (US)

(73) Assignee: Oklo Inc., Santa Clara, CA (US)

( * ) Notice: Subject to any disclaimer, the term of this patent is extended or adjusted under 35 U.S.C. 154(b) by 671 days.

(21) Appl. No.: 18/022,458

(22) PCT Filed: Aug. 19, 2021

(86) PCT No.: PCT/US2021/046746
§ 371 (c)(1),
(2) Date: Feb. 21, 2023

(87) PCT Pub. No.: WO2022/046521
PCT Pub. Date: Mar. 3, 2022

(65) Prior Publication Data

US 2023/0402197 A1 Dec. 14, 2023

Related U.S. Application Data

(60) Provisional application No. 63/067,582, filed on Aug. 19, 2020.

(51) Int. Cl.
*G21C 15/247* (2006.01)
*G21C 15/26* (2006.01)
(Continued)

(52) U.S. Cl.
CPC ........... *G21C 15/247* (2013.01); *G21C 15/26* (2013.01); *G21C 19/205* (2013.01); *G21C 19/30* (2013.01); *G21C 19/313* (2013.01); *G21D 3/001* (2013.01)

(58) Field of Classification Search
CPC ........ G21C 1/02; G21C 15/247; G21C 15/26; G21C 19/30; G21C 19/31; G21C 19/313
See application file for complete search history.

(56) References Cited

U.S. PATENT DOCUMENTS 2,841,545 A * 7/1958 Zinn .......................... G21D 5/08 376/349
3,422,766 A * 1/1969 Conibeer ................ F04D 7/065 415/214.1
(Continued)

FOREIGN PATENT DOCUMENTS

DE 3826864 A1 2/1990
EP 0308691 3/1989
(Continued)

OTHER PUBLICATIONS

Kozlov et al., "Sodium purification systems for NPP with fast reactors (retrospective and perspective views)," Nuclear Energy and Technology, Mar. 1, 2016, 2(1):5-13.
(Continued)

*Primary Examiner* — Sharon M Davis
(74) *Attorney, Agent, or Firm* — Fish & Richardson P.C.

(57) ABSTRACT

Methods and systems for in-vessel natural circulation alkali metal reactor systems, purification systems, and associated methods are disclosed. A nuclear reactor vessel system includes an inner vessel that defines an inner volume sized to at least partially enclose a reactor. The reactor includes a plurality of nuclear fuel elements at least partially enclosed within a cladding, the reactor being cooled by a liquid metal coolant in a primary coolant loop. A pool of immersing fluid
(Continued)

occupies a volume inside the inner vessel. The reactor vessel system includes an outer vessel sized to wholly or substantially enclose the inner vessel. A nuclear reactor power system includes a reactor core including an active fuel region; and a rotatable drum including at least one of a neutron absorbing material, a neutron leakage enhancing material, or a neutron reflecting material, the rotatable drum positioned external to the active fuel region of the reactor core.

9 Claims, 12 Drawing Sheets

(51) Int. Cl.

| | |
|---|---|
| ***G21C 19/20*** | (2006.01) |
| ***G21C 19/30*** | (2006.01) |
| ***G21C 19/313*** | (2006.01) |
| ***G21D 3/00*** | (2006.01) |

(56) References Cited

U.S. PATENT DOCUMENTS 4,608,224 A 8/1986 Brachet
4,802,531 A * 2/1989 Nathenson ............ F28D 7/1653 165/104.23
2013/0216015 A1 8/2013 Gautier
2016/0329113 A1 11/2016 El-Genk
2019/0206580 A1* 7/2019 Walters .................... G21C 3/06

FOREIGN PATENT DOCUMENTS

FR 2521762 A1 * 8/1983 ........... G21C 19/313
GB 1447928 A * 9/1976 ........... G21C 19/313
JP 2009250886 A * 10/2009
JP 2011-75490 A 4/2011
JP 2013-543586 A 12/2013
JP 2014-10105 A 1/2014
RU 2608596 C1 * 1/2017 ............ G21C 19/31
WO WO 2017/188274 A1 11/2017

OTHER PUBLICATIONS

Office Action in European Appln. No. 21840715.3, mailed on Jun. 10, 2024, 10 pages.
International Preliminary Report on Patentability in International Appln. No. PCT/US2021/046746, mailed on Mar. 2, 2023, 12 pages.
International Search Report and Written Opinion in related International Application No. PCT/US2021/046746, dated Mar. 25, 2022, 15 pages.
Office Action in JP Appln. No. 2023-512701, mailed on Sep. 11, 2025, 11 pages, with English Translation.

* cited by examiner

IN-VESSEL NATURAL CIRCULATION ALKALI METAL REACTOR SYSTEM, PURIFICATION SYSTEM, AND ASSOCIATED METHODS

CROSS-REFERENCE TO RELATED APPLICATIONS

This application is a U.S. National Stage Application under 35 U.S.C. § 371 and claims the benefit of International Application No. PCT/US2021/046746 filed Aug. 19, 2021, which claims the benefit of U.S. Provisional Patent Application Ser. No. 63/067,582 filed Aug. 19, 2020, which is incorporated herein by reference in its entirety.

TECHNICAL FIELD

The present embodiment relates generally to nuclear reactors, and more specifically to reactors that use liquid metals.

BACKGROUND

Global energy growth and a drive to reduce pollution and emissions is stimulating new activity around the commercialization and design of new reactor technologies. Some of these technologies include small reactors designed to provide long lasting and resilient power in a more distributed fashion. Some of these reactors incorporate liquid metals into their design and cooling due to the favorable heat transfer and neutronic characteristics of liquid metals.

SUMMARY

This disclosure describes implementations of systems and methods for in-vessel natural circulation alkali metal reactor systems and purification systems. According to some embodiments, a nuclear reactor may include: fuel including a fissile material such as uranium-233, uranium-235, or plutonium-239; a coolant that uses alkali, e.g., sodium, metals to transport heat away from the fuel, a heat exchanger to transfer the heat from the coolant or cooling device to a power conversion system, as well as instrumentation, supporting structures and shielding.

According to some embodiments the fissile material may be contained in fuel elements. The fuel elements may be held inside a reactor vessel.

According to some embodiments, liquid metal primary coolant transfers heat from the fuel, and carry the heat to a heat exchanger where the heat is transferred to an intermediate coolant or to a power conversion working fluid.

According to some embodiments, auxiliary heat exchangers are used to remove afterheat and stored energy. These heat exchangers use liquid metals, salts, or gases for afterheat removal, which is then rejected to ambient air or water.

According to some embodiments, a decay heat removal auxiliary cooling system is used to passively remove decay heat from the reactor vessel.

According to some embodiments, external cooling can remove heat from the reactor vessel system via a fluid, such as air, or a liquid.

According to some embodiments, the liquid metal flows by natural circulation, transferring heat by natural convection.

According to some embodiments, the liquid metal flows via natural circulation at steady state conditions ranging in power levels spanning from reactor startup to full power.

According to some embodiments, one or more booster pumps are used to facilitate reactor startup by establishing flow patterns via forced and mixed circulation, which then transitions to natural circulation at desired power levels, and the pumps are shut down.

According to some embodiments, booster pumps are placed in vessel, at either the heat exchanger outlet, or the core inlet. According to some embodiments, booster pumps are placed in a segment of the primary flow loop that is external to the vessel.

According to some embodiments, momentum based circulators, e.g., flywheels, are positioned at booster pump outlet to provide rotating inertia for the coolant.

According to some embodiments, maintaining sufficient coolant chemistry and purity control is important to ensuring coolant and component longevity. A cold trap may be used to control chemistry and purity of the liquid metal coolant.

According to some embodiments, the cold trap is placed in the reactor vessel and in an area where sufficient coolant flow occurs. According to some embodiments, the cold trap is cooled by pre-cooled bypass flow of the intermediate coolant which has been cooled to cold trap operating temperatures. Pre-cooling may be accomplished by a heat exchanger, or direct cooling device.

According to some embodiments, the cold trap is cooled by bypass flow of the decay heat removal auxiliary cooling system coolant which has been cooled to cold trap operating temperatures.

According to some embodiments, the reactor core, which includes fuel, structures, reflectors, and shielding, the riser, the primary heat exchanger, and supporting components are cooled by a flow loop that is entirely housed inside a vessel.

According to some embodiments, the flow loop is immersed in a fluid contained inside the reactor vessel. The immersing fluid may be used to provide cooling for components or systems. The immersing fluid may provide thermal storage capabilities.

According to some embodiments, the immersing fluid is the same fluid that is used as the primary coolant. According to some embodiments, the coolant in the primary coolant loop is hydraulically connected to the fluid in the immersing pool.

According to some embodiments, a hydraulic connection between the immersing fluid and the primary coolant is made by a flow diode, pressure gate, permeable membrane, or height difference that is designed to allow flow between coolant bodies at certain conditions, such as certain ranges of flow rates, coolant levels, pressure differentials, and temperatures.

According to some embodiments, the hydraulic connection of the primary coolant and immersing fluid can enhance the natural circulation characteristics of the system, increase the thermal mass of the fluid available to the system, and provide thermal coupling to auxiliary heat removal pathways for afterheat removal.

According to some embodiments, fuel elements and other in-core elements can be removed from the reactor via conduits or ducts that reach to the top, or near the top of the free surface of the pool above each fuel assembly and serve as standpipe-like structures for easier fuel withdrawal through the conduits.

According to some embodiments, fuel elements can be manipulated or withdrawn using a temporary fuel handling machine that is brought into the plant only when the handling machine is needed.

According to some embodiments, fuel elements have unique marker posts that extend upwards through the riser up to, or near the free pool surface. The marker posts can be structurally connected to the fuel elements and act as extended lifting handles, reducing or eliminating the need to handle fuel elements through deep liquid metal pools.

According to some embodiments, reactor components, such as heat exchangers or pumps are integrated in modular packages to allow for easier inspection, maintenance, and replacement.

According to some embodiments, pumps can be packaged with, or in proximity to heat exchangers so that the intermediate coolant flowing into the heat exchanger can be used to cool the pumps. In some examples, the intermediate coolant can cool the pumps below the operating temperatures of the primary coolant.

According to some embodiments, the pumps are placed in contact with the vessel wall so that the pumps can be cooled by conduction through the vessel wall.

According to some embodiments, the intermediate coolant can be the same coolant as the primary coolant. The coolant may also be a heat transfer fluid with high specific heat, such as a liquid salt.

According to some embodiments, the reactor uses absorbing rods to control the reactor power level, and in some cases, the rods are used solely to shut the reactor down. These rods can be positioned to insert into the reactor core in the active fuel region, or the reflector region.

According to some embodiments, passive or inherent reactor control devices can be positioned within removable assembly cartridges allowing for testing, replacement, and servicing. Such devices may include flow levitated absorbers, fusible latch absorbers, curie point latch absorbers, expanding liquid absorbers, or expanding gas driven absorbers, among others.

According to some embodiments, rotating drums are used to control neutron leakage, and therefore reactor power. These drums are positioned external to the active fuel region of the reactor core. These drums contain neutron absorbing material, neutron leakage enhancers, or neutron reflectors.

According to some embodiments, the drums are suspended via their driveline shaft. According to some embodiments, the drums are mounted on bearings or discs that provide structural support, alignment, and provide sufficient lubrication to allow for rotation, while being compatible with the coolant. These may be made of metallic materials or ceramic materials, such as nitrides or carbides.

According to some embodiments, the drums are contained in cartridges that isolate the drums from the primary coolant.

According to some embodiments, a power conversion system is connected via a heat exchanger to the intermediate coolant where a working fluid is heated and then used to drive the power conversion turbomachinery.

According to some embodiments, the power conversion system uses steam, gas, or supercritical fluids.

According to some embodiments, the power conversion system directly transfers heat from the primary system via a power conversion system heat exchanger.

According to some embodiments, the power plant, including the reactor, is controlled using automatic control mechanisms. According to some embodiments, compiler advancements allow the training of system controllers to better simulate controls maneuvers all from the same program According to some embodiments, automatic differentiation capabilities for use in machine learning techniques are used to create differentiable programs where derivatives can be taken through complex code with loops, branches, and other structures. Various tools are connect to a compiler to create compiled derivative versions of a function so that derivative method f(x) for arbitrarily complex f(x) can be efficiently compiled.

According to some embodiments, thus can be used to compute sensitivity studies. According to some embodiments, the ability to take derivatives of an arbitrarily complex function with respect to any of its parameters allows trainable models to be used as part of a differentiable program.

According to some embodiments, a function whose inputs are the current system state and some desired target state are created, and the resulting information is provided to a trainable model, which acts as a controller, and gives interpretable suggestions for controls maneuvers it believes are required to take the system to the target state. This suggestion and the current system state are used to solve the differential equation to determine what the actual result of those controls maneuvers is. The difference between the results of the differential equation solver and the target state yield a metric for the usefulness of the trainable model of the reactor and power plant.

According to some embodiments, automatic differentiation allows for the direct computation of gradients of the loss value with respect to the internal parameters of the controller model. A neural network is an example. The function can be run in a loop and the parameters of the controller updated, thereby minimizing the loss, and improving the quality of controls suggestions coming from the model for the reactor and power plant.

According to some embodiments, the controller is trained by letting the controller repeatedly attempt to get the system to a target state, rather than having to define reward functions, or generate training data of any kind. This removes the need to implement black-box reinforcement learning algorithms in favor of differentiable control methods to achieve faster convergence to more effective controls schemes of the reactor and power plant.

In an example implementation, a nuclear power reactor vessel system includes an inner vessel that defines an inner volume sized to at least partially enclose a reactor cooled by a liquid metal coolant in a primary coolant loop; and an outer vessel sized to wholly or substantially enclose the inner vessel.

In an aspect combinable with the example implementation, the reactor includes a plurality of nuclear fuel elements.

In an aspect combinable with any of the previous aspects, at least a portion of the plurality of nuclear fuel elements is at least partially enclosed within a cladding.

In an aspect combinable with any of the previous aspects, the system includes a heat exchanger configured to transfer heat from the liquid metal coolant to an intermediate coolant.

In an aspect combinable with any of the previous aspects, the system includes a heat exchanger configured to transfer heat from the liquid metal coolant to a power conversion working fluid.

In an aspect combinable with any of the previous aspects, the heat exchanger is a low pressure drop heat exchanger.

In an aspect combinable with any of the previous aspects, the system includes a cold trap configured to purify the liquid metal coolant.

In an aspect combinable with any of the previous aspects, the cold trap is positioned in the coolant loop and is cooled by intermediate coolant flowing from one of an intermediate coolant circuit or a passive reactor cooling system.

In an aspect combinable with any of the previous aspects, the cold trap is positioned at a heat exchanger outlet.

In an aspect combinable with any of the previous aspects, the system includes a hot trap positioned in the primary coolant loop and configured to purify the liquid metal coolant.

In an aspect combinable with any of the previous aspects, during operation, the liquid metal coolant flows through the primary coolant loop by natural circulation.

In an aspect combinable with any of the previous aspects, the liquid metal coolant flows by natural circulation at steady-state conditions at power levels ranging from reactor startup to full power.

In an aspect combinable with any of the previous aspects, the system includes a booster pump configured to pump the liquid metal coolant through the primary coolant loop.

In an aspect combinable with any of the previous aspects, the booster pump is positioned at a heat exchanger outlet.

In an aspect combinable with any of the previous aspects, the booster pump is positioned at a reactor inlet.

In an aspect combinable with any of the previous aspects, the booster pump is positioned in a segment of a coolant loop external to the outer vessel.

In an aspect combinable with any of the previous aspects, the system includes a momentum-based circulator positioned at an outlet of the booster pump.

In an aspect combinable with any of the previous aspects, the momentum-based circulator includes a flywheel.

In an aspect combinable with any of the previous aspects, the primary coolant loop is hydraulically isolated from the pool of immersing fluid.

In an aspect combinable with any of the previous aspects, the immersing fluid cools components of the system.

In an aspect combinable with any of the previous aspects, the immersing fluid stores thermal energy generated by the reactor.

In an aspect combinable with any of the previous aspects, the immersing fluid is the same fluid as the liquid metal coolant.

In an aspect combinable with any of the previous aspects, the immersing fluid and the liquid metal coolant are hydraulically connected.

In an aspect combinable with any of the previous aspects, the immersing fluid and the liquid metal coolant are hydraulically connected by one of a flow diode, a pressure gate, a permeable membrane, or a height difference.

In an aspect combinable with any of the previous aspects, the system includes a modular package of reactor vessel components.

In an aspect combinable with any of the previous aspects, the modular package is removable from the system.

In an aspect combinable with any of the previous aspects, the modular package includes a heat exchanger and a pump.

In an aspect combinable with any of the previous aspects, during operation, intermediate coolant flowing through the heat exchanger cools the pump.

In an aspect combinable with any of the previous aspects, during operation, the intermediate coolant cools the pump to a temperature below an operating temperature of the liquid metal coolant.

In an aspect combinable with any of the previous aspects, the intermediate coolant includes the same fluid as the liquid metal coolant.

In an aspect combinable with any of the previous aspects, the intermediate coolant includes a liquid salt.

In another example implementation, a method includes operating the nuclear reactor vessel system of any one of the previous implementations to produce electrical power.

In another example implementation, a nuclear reactor power system includes a reactor core including an active fuel region; and a rotatable drum including at least one of i) a neutron absorbing material, ii) a neutron leakage enhancing material, or iii) a neutron reflecting material, the rotatable drum positioned external to the active fuel region of the reactor core.

In an aspect combinable with the example implementation, the rotatable drum is suspended by a driveline shaft.

In an aspect combinable with any of the previous aspects, the rotatable drum is mounted on a bearing, the bearing providing lubrication to allow for rotation of the rotatable drum.

In an aspect combinable with any of the previous aspects, the bearing is made from one of a metallic material or a ceramic material.

In an aspect combinable with any of the previous aspects, the rotatable drum is enclosed in a container isolating the rotatable drum from the liquid metal coolant.

In an example implementation, a process of refueling a reactor core having a plurality of core elements arranged in a lattice, the plurality of core elements including at least a plurality of fuel elements and a plurality of reflector elements is disclosed. The process includes removing a reflector element from a first lattice position; moving a fuel element from a second lattice position to the first lattice position, the first lattice position being a different distance from a center of the lattice than the second lattice position; and loading the reflector element into a third lattice position, the third lattice position being a different distance from the center of the lattice than the first lattice position and the second lattice position.

In an aspect combinable with the example implementation, the fuel element is a first fuel element, and the process includes: after moving the first fuel element from the second lattice position to the first lattice position, loading a second fuel element into the second lattice position.

In an aspect combinable with any of the previous aspects, the first fuel element is an irradiated fuel element and the second fuel element is an unirradiated fuel element.

In an aspect combinable with any of the previous aspects, the fuel element is not removed from the reactor core.

In an aspect combinable with any of the previous aspects, the reactor core includes: a core barrel having at least one side; an active fuel region positioned within the core barrel and including the plurality of fuel elements; and a reflector region positioned within the core barrel and including the plurality of reflector elements. The reflector region is concentric with the active fuel region, the reflector region having an inner boundary adjacent to the active fuel region and an outer boundary that is nearer to the sides of the core barrel than the inner boundary. The first lattice position is located at the inner boundary of the reflector region, and the third lattice position is located at the outer boundary of the reflector region.

In an aspect combinable with any of the previous aspects, the first lattice position is a greater distance from a center of the lattice than the second lattice position.

In an aspect combinable with any of the previous aspects, the third lattice position is a greater distance from the center of the lattice than both the first lattice position and the second lattice position.

In an aspect combinable with any of the previous aspects, the third lattice position is previously unoccupied by either a fuel element or a reflector element.

In an aspect combinable with any of the previous aspects, the third lattice position is exclusive of either a fuel element or a reflector element.

In an example implementation, a process of refueling a reactor having a plurality of fuel elements arranged in a lattice is disclosed. The process includes moving a first fuel element from a first lattice position to a second lattice position, the first lattice position being a different distance from a center of the lattice than the second lattice position; and loading a second fuel element into the first lattice position.

In an aspect combinable with the example implementation, the first fuel element is an irradiated fuel element and the second fuel element is an unirradiated fuel element.

In an aspect combinable with any of the previous aspects, the first fuel element is not removed from the reactor core.

In an aspect combinable with any of the previous aspects, the second lattice position is a greater distance from a center of the lattice than the first lattice position.

In an aspect combinable with any of the previous aspects, the reactor core includes: a core barrel having at least one side; an active fuel region positioned within the core barrel and including the plurality of fuel elements; and a reflector region positioned within the core barrel and including a plurality of reflector elements. The reflector region is concentric with the active fuel region and includes an inner boundary adjacent to the active fuel region and an outer boundary that is nearer to the sides of the core barrel than the inner boundary. The first lattice position is located within the active fuel region, and the second lattice position is located at or near the inner boundary of the reflector region.

In an aspect combinable with any of the previous aspects, the second lattice position is previously unoccupied by either a fuel element or a reflector element.

In an aspect combinable with any of the previous aspects, the second lattice position is exclusive of either a fuel element or a reflector element.

In an aspect combinable with any of the previous aspects, the process includes moving a reflector element from the second lattice position to a third lattice position or out of the reactor core prior to moving the first fuel element from the first lattice position to the second lattice position.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
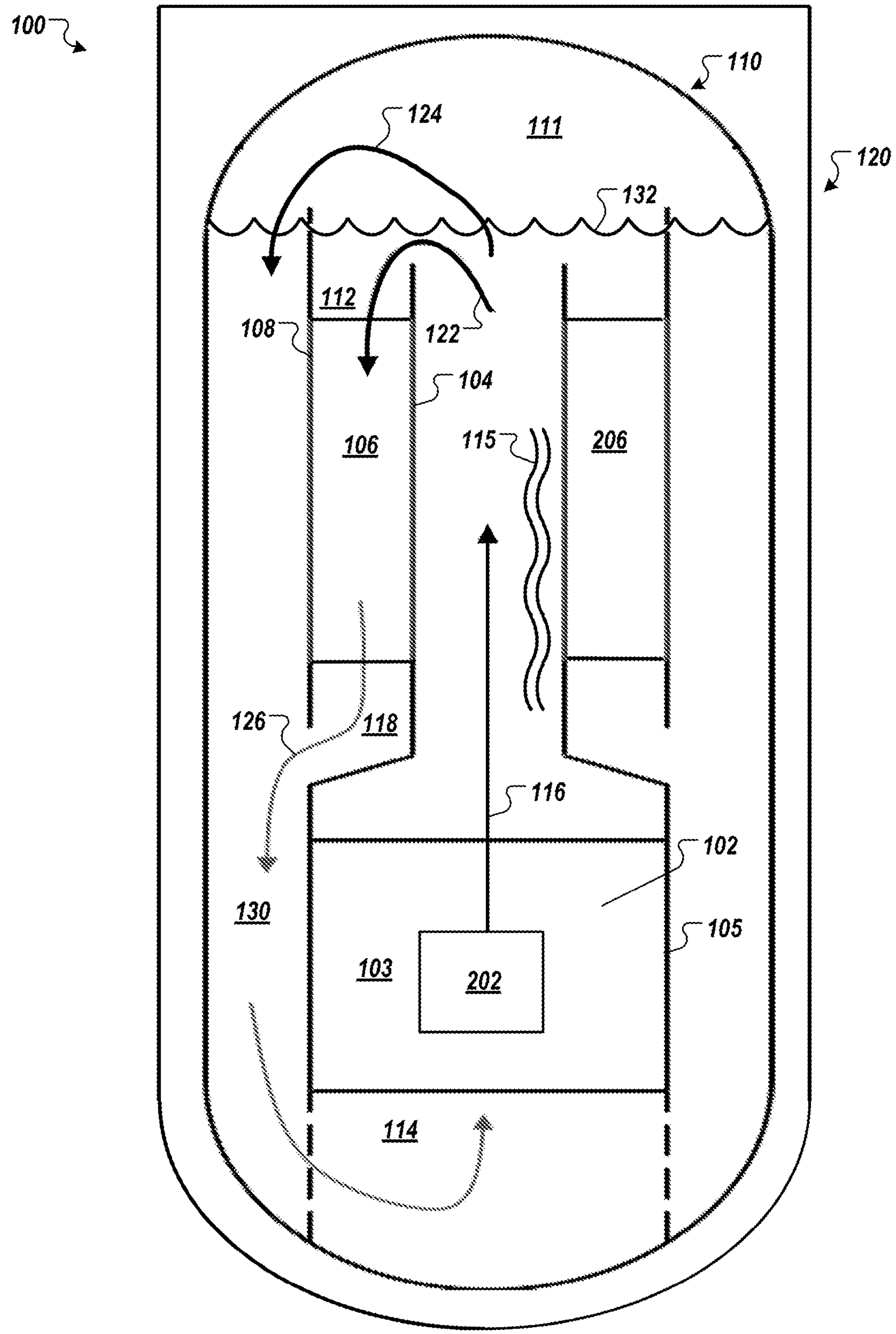
FIG. 1 shows a cross-sectional view of an example implementation of a nuclear reactor vessel system according to the present disclosure.

Implementations of the present disclosure include nuclear reactors and support systems. A nuclear reactor may include: fuel including a fissile material such as uranium-233, uranium-235, or plutonium-239; a coolant that uses alkali metals to transport heat away from the fuel, a heat exchanger to transfer the heat from the coolant or cooling device to a power conversion system, as well as instrumentation, supporting structures and shielding. The fissile material may be contained in fuel elements, and the fuel elements may be held inside a reactor vessel. Liquid metals transfer heat from the fuel, and carry the heat to a heat exchanger where the heat is transferred to an intermediate coolant or to the power conversion working fluid. Auxiliary heat exchangers can be used to remove afterheat and stored energy. These heat exchangers use liquid metals, salts, or gases for afterheat removal, which is then rejected to ambient air or water. External cooling can remove heat from the vessel system via a fluid, such as air, or a liquid. In some examples, a decay heat removal auxiliary cooling system is used to passively remove decay heat from the reactor vessel.

In an example implementation, a reactor operates with a liquid metal, such as liquid sodium or liquid lead, flowing by natural circulation driven by a difference in density between the coolant at its operating temperature in the core and the coolant at its operating temperature in the heat exchanger, combined with the elevation difference between the core and the heat exchanger.

The entire primary system can be enclosed in a container that may be filled with shielding and thermally conductive materials such that it can conduct heat out radially, and the volume can accommodate leaks of coolant while keeping the fuel covered. Electromagnetic pumps may drive coolant through the system. The reactor package may be containerized and transportable along with the power conversion system.

The fuel may be composed of a hydride bearing fuel form, such as uranium zirconium hydride (UZrH). The reactor may be cooled by liquid metals, such as sodium. Fuel can be arranged in a hexagonal lattice, potentially in tight packing with pitch over diameter ratios of 1.1 or less. Control drums can be used to control neutron reflection. Shut down rods or other absorbing mechanisms are used for shut down. The coolant carries heat from the reactor to the heat exchanger where heat is transferred to an intermediate coolant loop and eventually to a power conversion system that may include a turbine such as a small Brayton or Stirling engine.

The reactor core, which includes fuel, structures, reflectors, and shielding, the riser, the primary heat exchanger, and supporting components, can be cooled by a liquid metal primary coolant flow loop that is entirely housed inside the reactor vessel. The primary coolant flow loop is immersed in a pooled fluid contained in an immersing pool inside the reactor vessel. The pooled fluid can be used to provide cooling for components or systems, and can also be used to provide thermal storage capabilities.

FIG. 1 shows a diagram of an example reactor vessel system 100. The reactor vessel system 100 includes an inner vessel 110, e.g., a reactor vessel. The reactor vessel system 100 also includes an outer vessel 120, e.g., a guard vessel. The reactor vessel system 100 includes a reactor core 102 in a core barrel 105 (e.g., a cylindrical barrel or barrel with other cross-section besides a circle, such as a hexagon, octagon, or rectangle). The reactor core 102 has a core inlet 114. The reactor core 102 includes an active fuel region 202 and a shielding and reflector region 103.

The reactor vessel system 100 includes a riser 104 and a shroud 108. Between the riser 104 and the shroud 108 is a downcomer 112. A heat exchanger 106 is located within the downcomer 112. The heat exchanger 106 has a heat exchanger outlet 118. A pool region 130, e.g., a cold pool, is located inside the inner vessel 110 and outside of the core barrel 105 and the riser 104.

In the example configuration of FIG. 1, the liquid metal coolant 115 flows in an upward direction 116 through the reactor core 102, removing heat from the fuel elements of the active fuel region 202. As the liquid metal coolant 115 flows through the reactor core 102, the liquid metal coolant 115 heats up.

A low pressure drop fuel design can be achieved by using appropriate pitch to diameter ratios, for example in the range of 1.1 to 1.25. Wire wrap or spacer grids may be used to guide and assure fuel spacing along an axial length of the reactor core. Vertical fuel element ducts may have vents or perforations to allow for cross flow in the case of a flow blockage. The ducts may also have ribbing or similar internal structure to reduce peripheral flow areas.

The liquid metal coolant 115 exits the reactor core 102 and flows upwards through the riser 104, which may be shaped like a cylinder, square, rectangle, hexagon, or any number of suitable shapes. The riser 104 serves a similar function to a chimney, providing a flow path through which the liquid metal coolant 115 can rise.

The liquid metal coolant then flows in direction 122, over the riser 104 and down through the heat exchanger 106. The heat exchanger may be, for example, a secondary heat exchanger 106 or a decay heat removal heat exchanger 206. When passing through the heat exchanger 106, the liquid metal coolant transfers heat to the secondary coolant or power conversion fluid. As the liquid metal coolant transfers heat through the heat exchanger, the liquid metal coolant cools down. The heat exchanger is positioned in the downcomer 112, between the riser 104 on the inside, and the shroud 108 on the outside. The heat exchanger 106 can include flow channels, e.g., ducts, tubes, or an annulus, among other design configurations. To reduce pressure drops and provide preferential flow pathways, a low pressure drop heat exchanger may be used.

The cooled liquid metal coolant 115 exits the heat exchanger 106 and flows in a downward direction 126 into the pool region 130 in the area outside the riser 104 and the core barrel 105. The cooled liquid then flows through the core inlet 114 and starts the circuit again.

The shroud 108 provides a barrier between the downcomer 112 flow area, including the heat exchanger 106, and the pool region 130. The pool region 130 acts as a reservoir and thermal sink for the liquid metal coolant 115.

In some configurations, the top of the shroud 108 is placed at a height above a free surface 132 of the liquid metal coolant 115 in the riser 104. If the liquid metal coolant 115 heats up to a sufficient temperature, the liquid metal coolant 115 may expand enough to spill 124 over the shroud 108 and flow into the pool region 130. For example, at normal operating temperatures, the coolant might not spill over the shroud 108, while at temperatures above normal operating temperatures, the coolant may spill 124 over the shroud 108. A cover gas 111 is placed above the liquid metal coolant 115.

Separating the pool region 130 from the heat exchanger 106 can provide enhanced thermal performance, while reducing vessel temperatures. Furthermore, separating the pool region 130 from the heat exchanger 106 can provide enhanced heat removal pathways when needed, e.g., if the liquid metal coolant 115 reaches temperatures high enough to cause the liquid metal coolant 115 to spill 124 over the shroud 108.

The liquid metal coolant 115 may flow by natural circulation, transferring heat by natural convection. The liquid metal flows via natural circulation at steady state conditions ranging in power levels spanning from reactor startup to full power.

Figure 2:
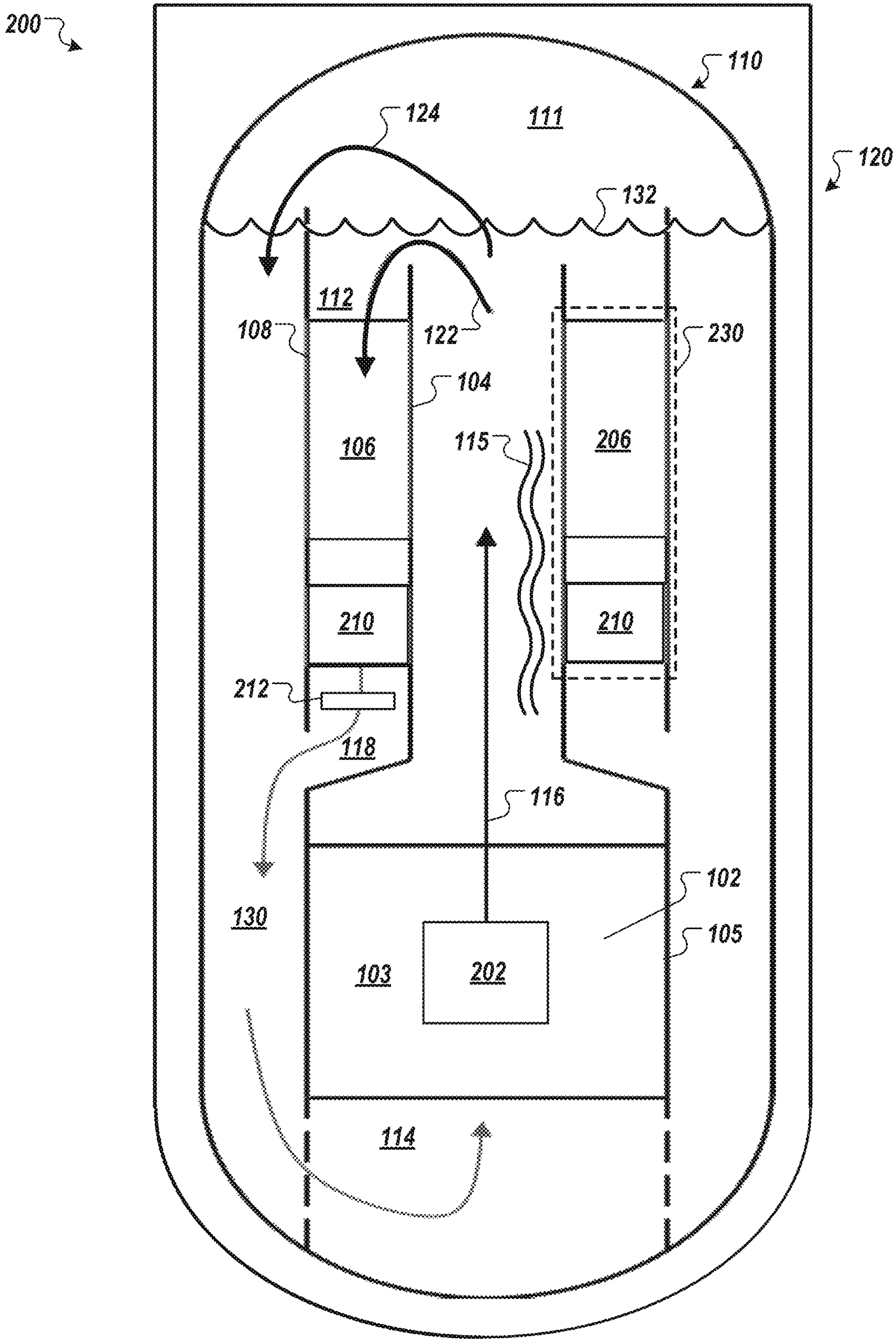
FIG. 2 shows a cross-sectional view of an example nuclear reactor vessel system with a booster pump.

FIG. 2 shows a cross-sectional view of an example nuclear reactor vessel system 200 with booster pumps 210. One or more booster pumps 210 may be used to facilitate reactor startup by establishing flow patterns via forced and mixed circulation. The liquid metal coolant 115 may then transition to natural circulation at desired power levels. Upon achieving natural circulation, the booster pumps 210 are shut down.

The booster pumps 210 may be positioned in the reactor vessel system, e.g., at the heat exchanger outlet 118, as shown in FIG. 2. In some examples, the booster pumps 210 may be positioned at the core inlet 114 instead of, or in addition to, being positioned at the heat exchanger outlet 118. In some examples, the booster pumps 210 may be placed in a segment of the primary flow loop that is external to the outer vessel 120. Momentum based circulators 212, e.g., flywheels, may be placed at the booster pump outlet to provide rotating inertia for the liquid metal coolant 115.

Figure 3:
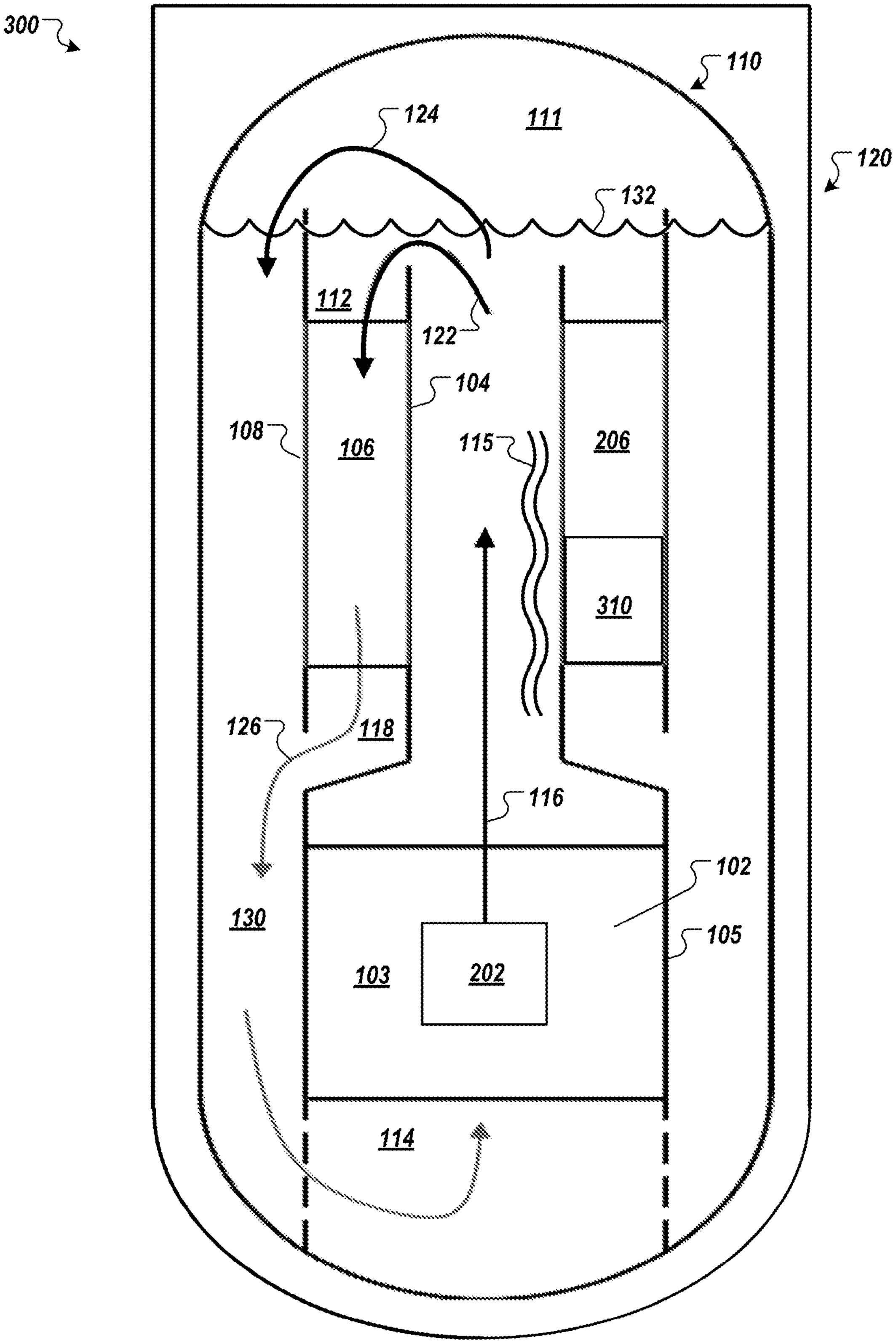
FIG. 3 shows a cross-sectional view of an example nuclear reactor vessel system with a cold trap.

FIG. 3 shows a cross-sectional view of an example nuclear reactor vessel system 300 with a cold trap 310. Maintaining sufficient coolant chemistry and purity control is important to ensuring coolant and component longevity. A cold trap 310 is used to control chemistry and purity of the liquid metal coolant. The cold trap 310 is positioned in the reactor vessel and in an area where sufficient coolant flow occurs. For example, as shown in FIG. 3, the cold trap 310 is positioned at an outlet of the decay heat removal heat exchanger 206.

Figure 4:
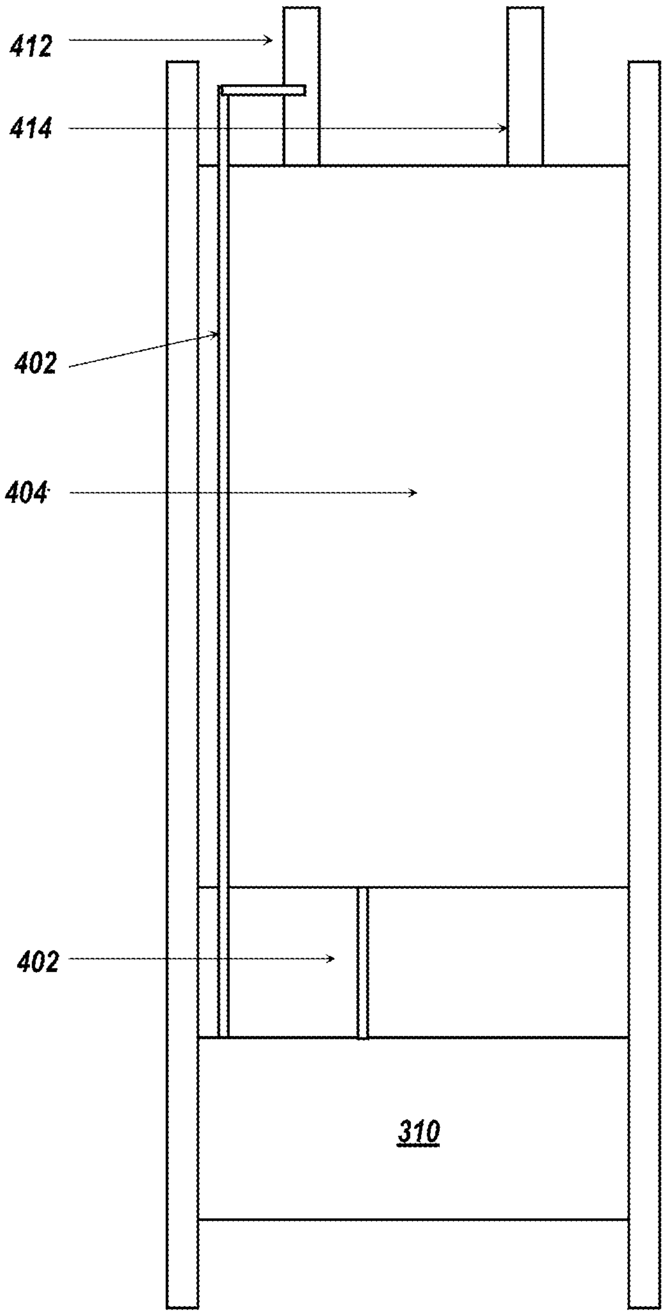
FIG. 4 shows a cross-sectional view of a cold trap cooled by an intermediate heat exchanger.

FIG. 4 shows a cross-sectional view of a cold trap 310 cooled by an intermediate heat exchanger 404. Coolant flows into the heat exchanger 404 through an inlet 412, and out of the heat exchanger 404 through an outlet 414. The cold trap may be cooled by pre-cooled bypass flow 402 of the intermediate coolant which has been cooled to cold trap operating temperatures. by the heat exchanger 404. The coolant returns to the heat exchanger 404 through a cold trap bypass return 402.

In some examples, the cold trap 310 may be cooled by a direct cooling device. The cold trap may also be cooled by an afterheat, or decay heat, removal system. In some examples, the cold trap is cooled by bypass flow of the decay heat removal auxiliary cooling system coolant which has been cooled to cold trap operating temperatures. In this way the cold trap may be integrated into, and cooled by, a passive reactor cooling system.

In some examples, the coolant purification system may use a hot trap. The hot trap can include a heater. When electrically powered, the heater heats the liquid metal coolant to a range of temperatures where the liquid metal coolant flows in contact with materials that react with impurities in the liquid metal coolant. For example, the liquid metal coolant may flow in contact with a material that reacts with oxygen, causing the oxygen to precipitate out of the liquid metal coolant solution.

Figure 5:
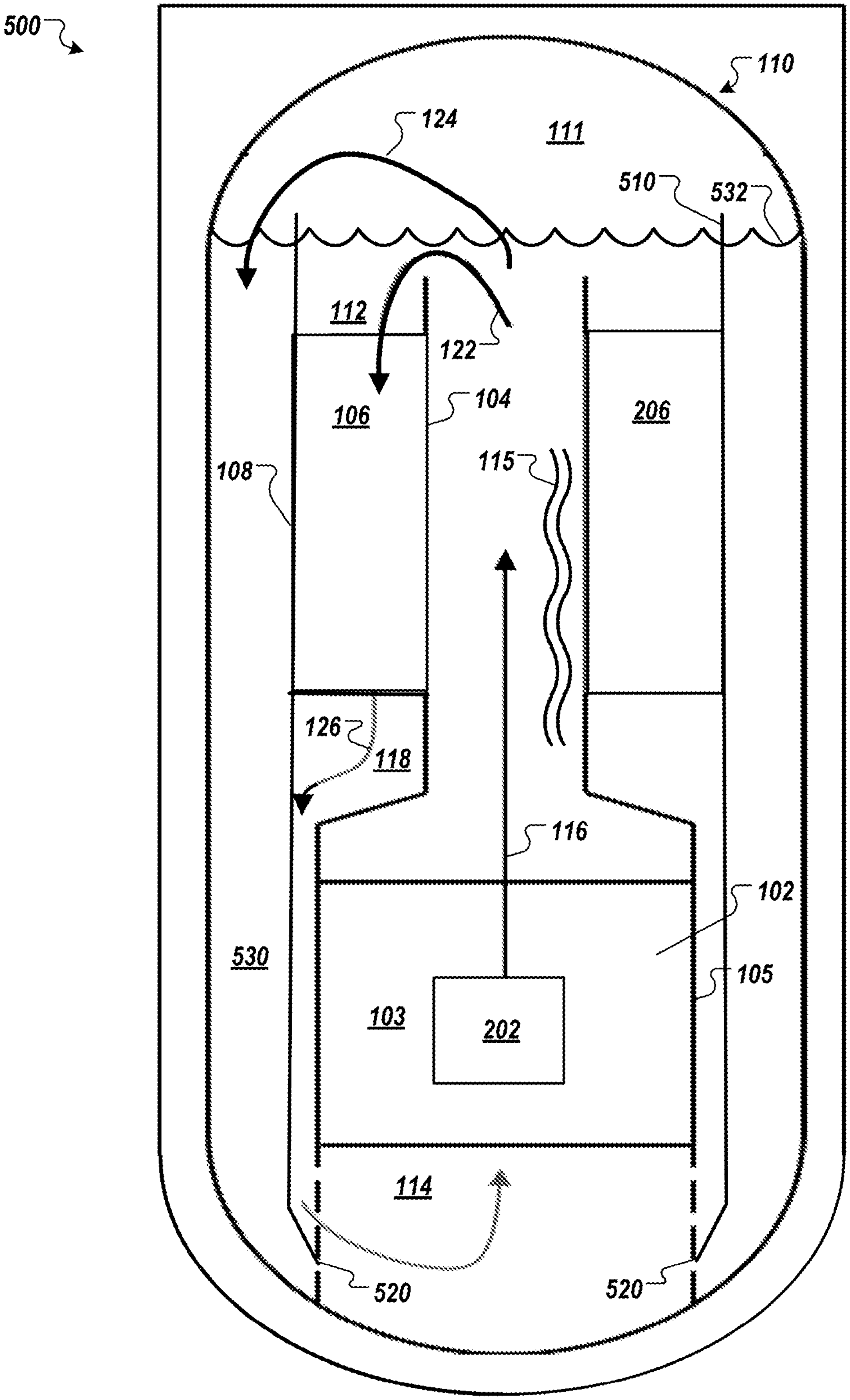
FIG. 5 shows a cross-sectional view of an example nuclear reactor vessel system with a free upper surface hydraulic connection and a lower hydraulic connection.

FIG. 5 shows a cross-sectional view of an example nuclear reactor vessel system with an immersing pool 530. The reactor vessel system 500 includes a free upper surface 532 of the immersing pool. The reactor vessel system 500 includes an upper hydraulic connection 510 and lower hydraulic connection 520 between the coolant 115 in the primary coolant flow loop and the coolant in the immersing pool 530. The coolant 115 in the primary coolant flow loop may be hydraulically connected to the coolant in the immersing pool. This hydraulic connection, e.g., upper connection 510 or lower connection 520, can be made by a flow diode, pressure gate, permeable membrane, or height difference that is designed to allow flow between coolant bodies at certain conditions, such as certain ranges of flow rates, coolant levels, pressure differentials, and temperatures. The hydraulic connections of the primary coolant and immersing fluid can enhance the natural circulation characteristics of the system, increase the thermal mass of the fluid available to the system, and provide thermal coupling to auxiliary heat removal pathways for afterheat removal.

Figure 6:
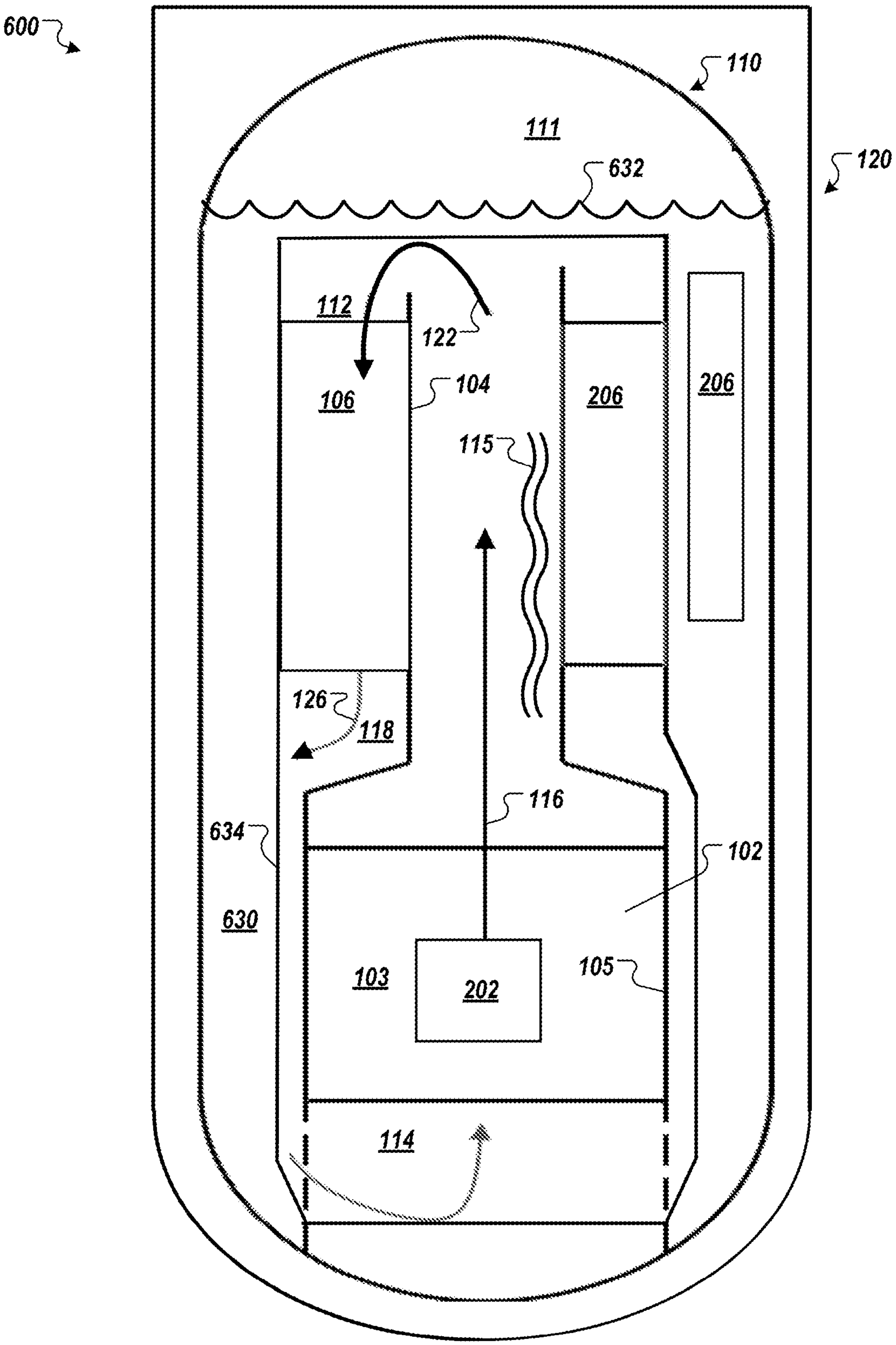
FIG. 6 shows a cross-sectional view of an example nuclear reactor vessel system with an enclosed coolant loop.

FIG. 6 shows a cross-sectional view of an example nuclear reactor vessel system 600 with an enclosed coolant loop. In the example nuclear reactor vessel system 600, the immersing fluid 632 of immersing pool 630 and the liquid metal primary coolant 115 are isolated from one another. The immersing fluid 632 is located outside of the core barrel 105 and inside the inside reactor vessel 110. The liquid metal primary coolant 115 flows through the primary coolant loop from the reactor 102, to the riser 104, to the heat exchanger 106, and returns to the core inlet 114. The immersing fluid 632 does not enter the core inlet. The immersing pool 630 is separated from the primary coolant loop and from the core inlet by a barrier 634.

Figure 7:
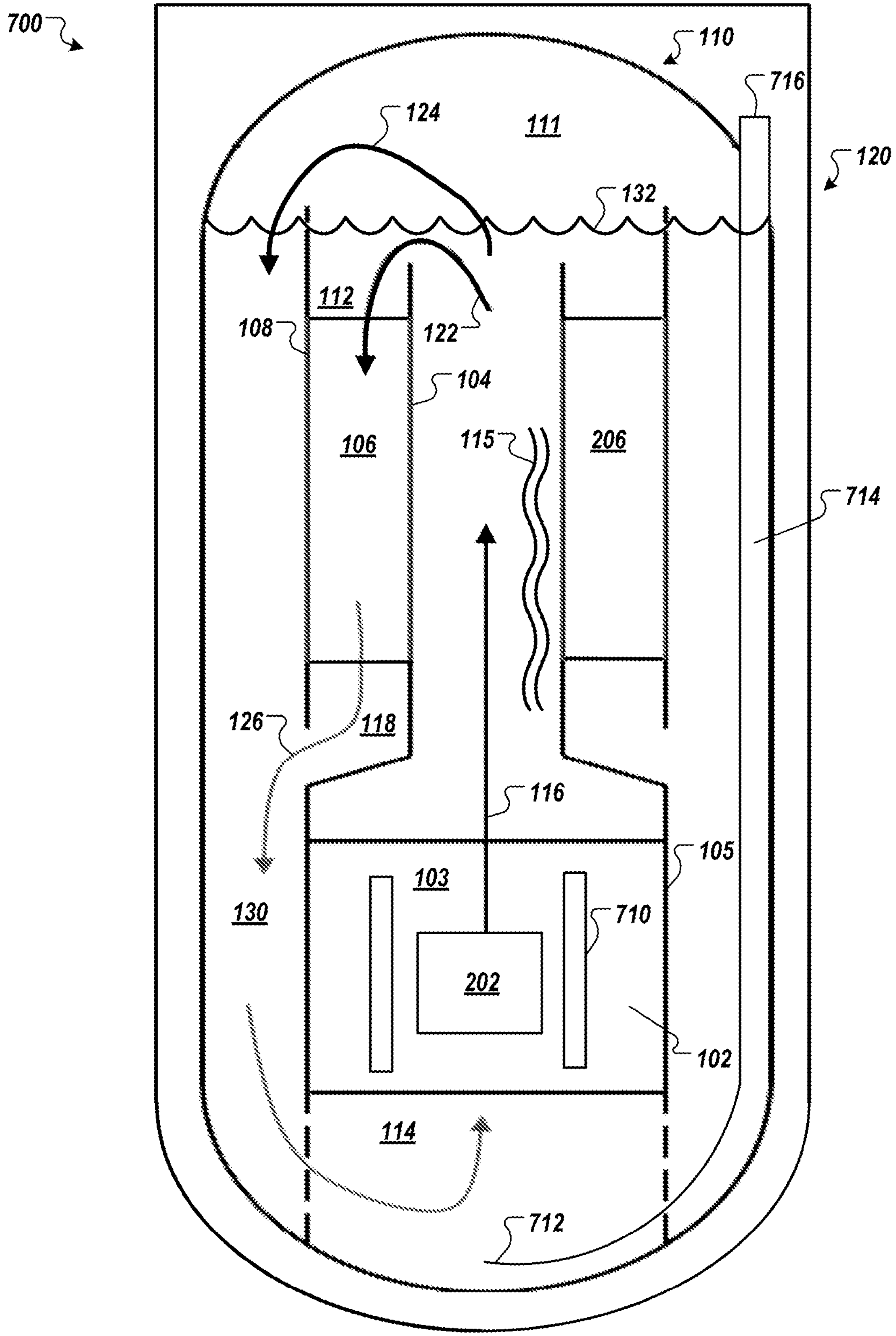
FIG. 7 shows a cross-sectional view of an example nuclear reactor vessel system with a drain syphon.

FIG. 7 shows a cross-sectional view of an example nuclear reactor vessel system 700 with a drain syphon. The reactor vessel system 700 includes an internal drain system via syphon or standpipe to the top of the vessel allowing for coolant filling, replenishing, servicing, and removal outside of the vessel with minimal invasion into the vessel. As shown in FIG. 7, the drain system includes drain piping 714, a drain basin 712, and a drain outlet interface 716.

In some examples, fuel elements and other in-core elements can be removed from the reactor via conduits or ducts that reach to the top, or near the top of the free surface of the pool above each fuel assembly and serve as standpipe-like structures for easier fuel withdrawal through the conduits. Fuel elements may be manipulated or withdrawn using a temporary fuel handling machine that is brought into the plant only when the handling machine is needed.

In some examples, fuel elements have unique marker posts that extend upwards through the riser up to, or near the free pool surface. The marker posts can be structurally connected to the fuel elements and act as extended lifting handles, reducing or eliminating the need to handle fuel elements through deep liquid metal pools.

Reactor components, such as heat exchangers or pumps, may be integrated in modular packages to allow for easier inspection, maintenance, and replacement. Pumps can be packaged with, or in proximity to, heat exchangers. In some examples, the intermediate coolant flowing into the heat exchanger can be used to cool the pumps. In some examples, the intermediate coolant can cool the pumps below the operating temperatures of the primary coolant. In some examples, the pumps are placed in contact with the vessel wall so that the pumps can be cooled by conduction through the vessel wall.

In some examples, the intermediate coolant can be the same coolant as the primary coolant. The coolant could also be a heat transfer fluid with high specific heat, such as a liquid salt.

The reactor may use absorbing rods to control the reactor power level, and in some cases, the rods are used solely to shut the reactor down. These rods can be positioned to insert into the reactor core in the active fuel region, or the reflector region. The reactor may also use burnable poisons in a manner that is favorable to the neutronic characteristics of the system.

In some examples, passive or inherent reactor control devices can be positioned within removable assembly cartridges allowing for testing, replacement, and servicing. Such devices may include flow levitated absorbers, fusible latch absorbers, curie point latch absorbers, expanding liquid absorbers, or expanding gas driven absorbers, among others.

Rotating drums can also be used to control neutron leakage, and therefore reactor power. As shown in FIG. 7, the drums 710 may be positioned external to the active fuel region 202 of the reactor core 102. The drums contain neutron absorbing material, neutron leakage enhancers, and/or neutron reflectors.

The drums 710 can be suspended via their driveline shaft, or mounted on bearings or discs. The bearings or discs can provide structural support and alignment, and provide sufficient lubrication to allow for rotation, while being compatible with the coolant. The bearings may be made of metallic materials or ceramic materials, such as nitrides or carbides. The drums 710 may also be contained in cartridges that isolate the drums 710 from the primary coolant.

Figure 8:
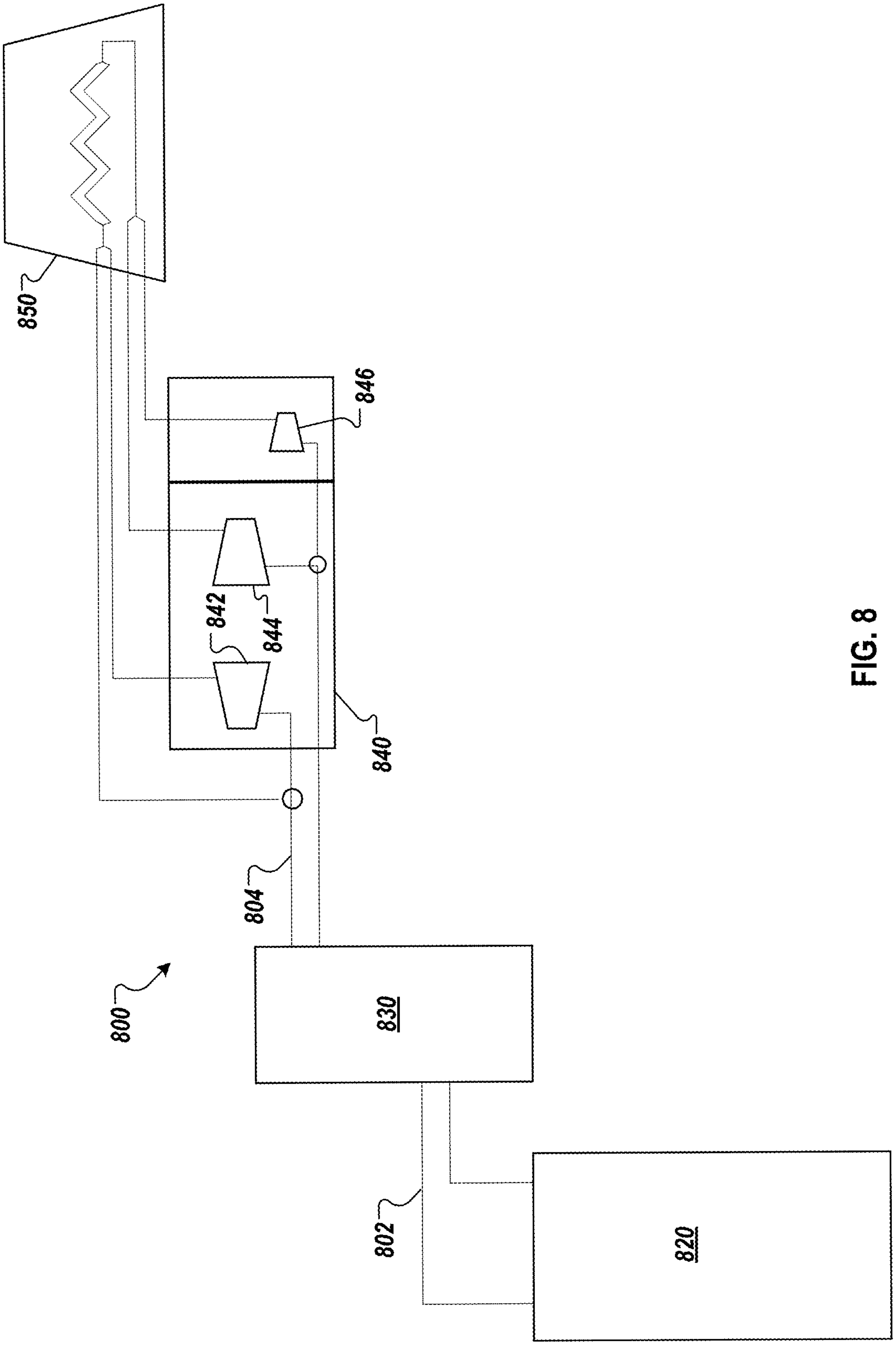
FIG. 8 shows a schematic diagram of an example nuclear reactor power system designed to directly transfer heat from the primary system via a power conversion system heat exchanger.

FIG. 8 shows a schematic diagram of an example nuclear reactor power system 800 designed to directly transfer heat from the primary system of a reactor module 820 via a power conversion system (PCS) heat exchanger 830. Liquid metals transfer heat from the fuel of the reactor module 820, and carry the heat through first piping 802 to the heat exchanger 830 where the heat is transferred to the power conversion working fluid. The power conversion working fluid flows through second piping 804 to a PCS system 840. The PCS system 840 includes a turbine 842, a pump 844, and an auxiliary pump 846.

An auxiliary heat exchanger 850 is used to remove afterheat and stored energy. The heat exchanger 850 use liquid metals, salts, or gases for afterheat removal, which is then rejected to ambient air or water. External cooling can remove heat from the vessel system via a fluid, such as air, or a liquid.

Figure 9:
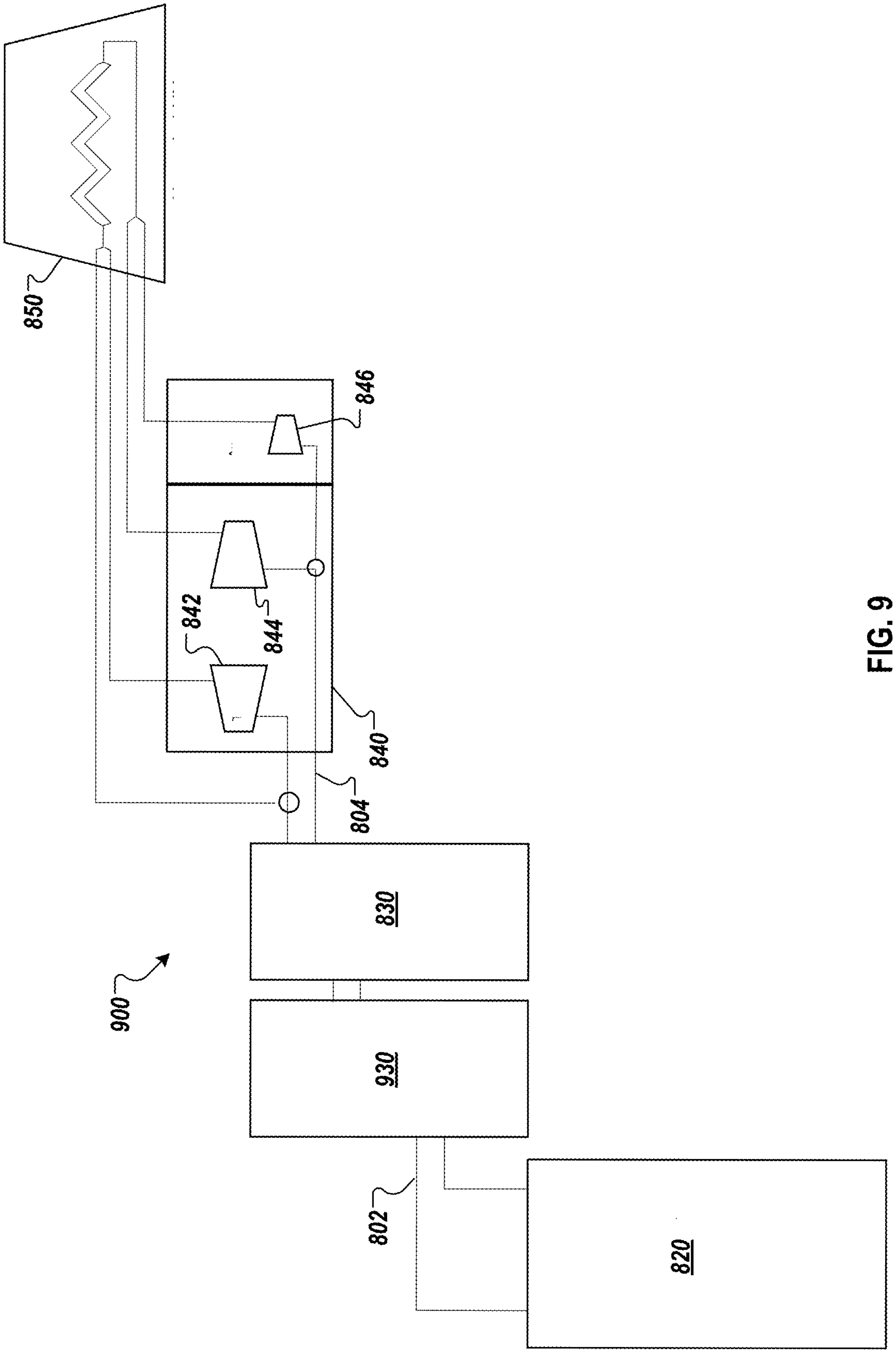
FIG. 9 shows a schematic diagram of an example nuclear reactor power system with an intermediate thermal energy storage system and a PCS heat exchanger.

FIG. 9 shows a schematic diagram of an example nuclear reactor power system 900 with an intermediate thermal energy storage system 930 and a PCS heat exchanger 830. Liquid metals transfer heat from the fuel of the reactor module 820, and carry the heat through first piping 802 to the thermal energy storage system 930 and to the heat exchanger 830 where the heat is transferred to the power conversion working fluid. Heat from thermal energy storage system 930 heats the power conversion working fluid.

The power conversion working fluid flows through second piping 804 to a PCS system 840. The PCS system 840 includes a turbine 842, a pump 844, and an auxiliary pump 846. The power conversion system 840 may be connected via the heat exchanger 830 to intermediate coolant where a working fluid is heated. The working fluid can then be used to drive the power conversion turbomachinery, e.g., the turbine 842, to produce electricity. The power conversion system 840 may use steam, gas, or supercritical fluids as the working fluid.

Figure 10:
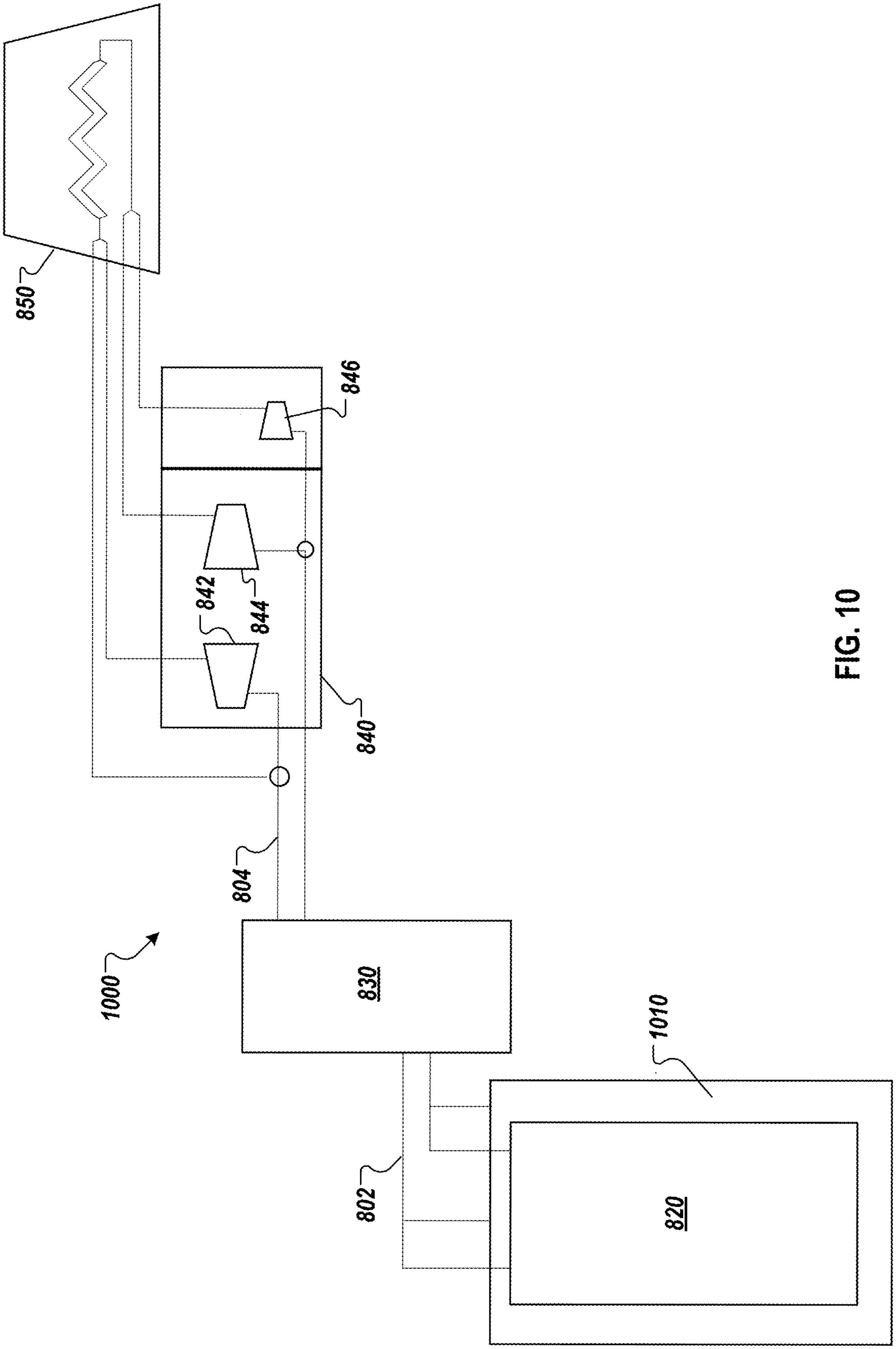
FIG. 10 shows a schematic diagram of an example nuclear reactor power system with in-vessel thermal energy storage.

FIG. 10 shows a schematic diagram of an example nuclear reactor power system 1000 with an in-vessel thermal energy storage system 1010. As described above with reference to FIG. 1, the in-vessel thermal energy storage system 1010 can include a pool region 130, e.g., a cold pool. The immersing fluid of the pool region 130 can provide the thermal storage capabilities.

Figure 11A:
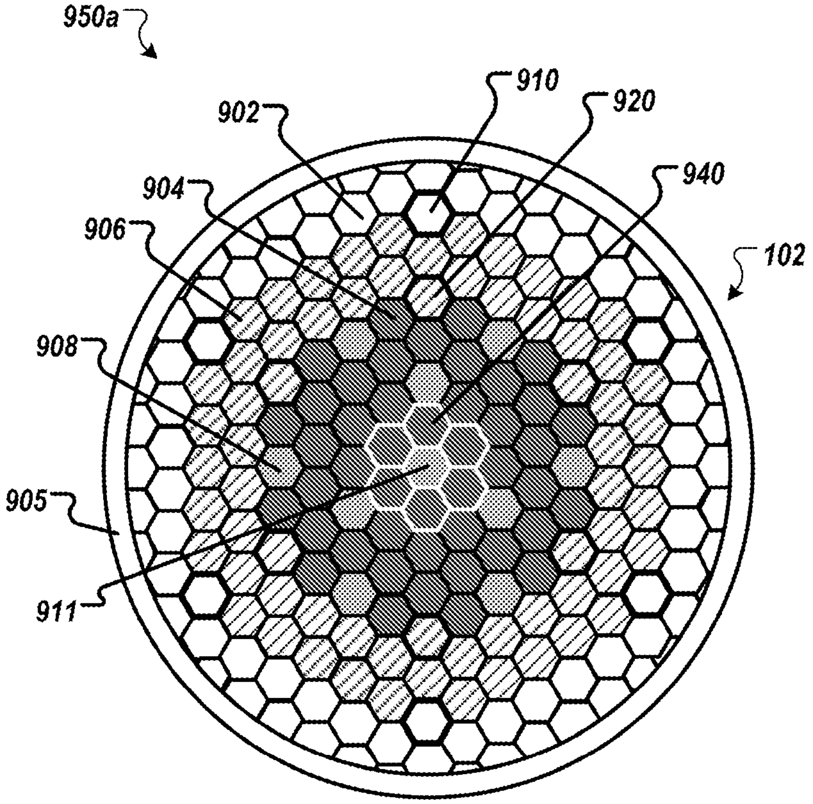
FIGS. 11A and 11B show a top cross-sectional view of a reactor core.
Figure 11B:
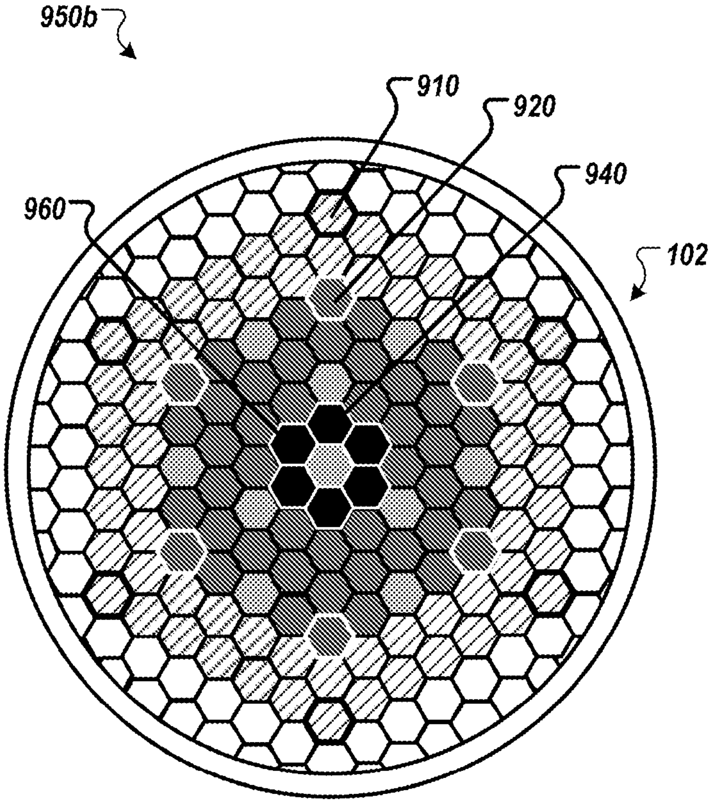

FIG. 11A and FIG. 11B show a top cross-sectional view of a reactor core. FIG. 11A shows a top cross-sectional view 950*a* of a reactor core 102 before a refueling process. FIG. 11B shows a top cross-sectional view 950*b* of the reactor core 909 after the refueling process. The reactor core 102 depicted in FIGS. 11A and 11B can be, for example, the reactor core of any of FIG. 1, 2, 3, 5, 6, or 7. The reactor core 102 includes hexagonal elements arranged in a lattice. In some implementations, instead of or in addition to hexagonal elements, the reactor core 102 can include elements having other shapes such as square and circular shapes. The reactor elements are located within a core barrel 905.

Reactor elements can be arranged in a way that facilitates refueling. For example, unfilled regions can be included in the reactor core 102, where no fuel element, control element, or reflector element is located. During refueling, fuel elements from regions near to the center of the core can be moved to locations further away from the center of the core. The fuel elements from the regions near to the center of the core may be at least partially depleted, or spent. In some implementations, the fuel elements from the regions near the center of the core can be moved to an unfilled location. In some implementations, the fuel elements from the regions near the center of the core can be moved to a location where a reflector element was previously located, and the reflector element can be moved to an unfilled location.

By moving used fuel elements outward in the core, fuel elements that have been depleted can be positioned in ways that expand the width and volume of the active region of the core. This can reduce surface area to volume ratios would decrease, e.g., by ten percent or greater or by twenty percent or greater. This can enhance geometric buckling and reduce neutronic leakage. Additionally, the disclosed techniques can result in spent or irradiated fuel remaining inside the core barrel after refueling. This can simplify fuel handling operations, reduce radiation exposure to personnel, and reduce the amount of spent fuel that is stored outside of the reactor core. Thus, the amount of required spent fuel storage space can be reduced. For example, the number of spent fuel casks and/or the size of spent fuel pools needed to store spent fuel can be reduced.

In the example of FIGS. 11A and 11B, the reactor core 102 includes fuel elements 904, reflector elements 906, and control elements 908. The reactor core 102 also includes unfilled regions 902 where no fuel element, control element, or reflector element is located. The unfilled regions 902 may contain primary coolant and may conduct primary coolant through reactor core 102 during operation. In FIGS. 11A and 11B, fuel elements 904 are represented in dark gray shading, control elements 908 are represented in light gray shading, reflector elements 906 are represented in a diagonal pattern, and unfilled regions 902 are represented as white with no shading or pattern.

As shown in FIG. 11A, prior to refueling, the reactor core 102 includes an unfilled region at element location 910, at an outer boundary where the reflector elements 906 abut the unfilled regions. Prior to refueling, the reactor core 102 includes a reflector element at element location 920, at an outer boundary where the fuel elements 904 abut the reflector elements 906. Innermost fuel elements 940 are located near the center 911 of the core and are shown with white outlines. The innermost fuel elements, e.g., the fuel element at element location 940, are exposed to high levels of neutron flux and thus can be more quickly depleted than fuel elements that are located further away from the center 911.

During a refueling process, fuel elements from locations near to the center 911 of the core can be moved to areas further away from the center 911, e.g., replacing a reflector element 906. The replaced reflector element 906 can also be moved further away from the center 911, e.g., to an unfilled location 902. For example, the reflector element located at element location 920 can be moved to the unfilled element location 910. The fuel element located at element location 940 can then be moved to the element location 920. This pattern can be repeated for multiple fuel elements and reflector elements. In some implementations, new fuel elements can be loaded into the core in the innermost element locations, e.g., element location 940. A new fuel element can be, for example, an unirradiated fuel element.

As shown in FIG. 11B, after refueling, the reactor core 102 includes a reflector element at element location 910, which was moved from element location 920. The reactor core 102 also includes a fuel element at element location 920, which was moved from element location 940. A similar pattern repeats around the core, with the six innermost fuel elements moving to an outer boundary of the active fuel region, and replaced reflector elements moving to an outer boundary of the reflector region. New fuel elements 960, represented in black shading, are loaded into the innermost fuel regions.

Although described as moving elements outwards from the center 911 of the core, other implementations are possible. For example, the core can be arranged such that unfilled regions are located throughout the core. Additionally, during refueling, fuel elements from anywhere in the core can be moved to any unfilled region of the core or to any location that was previously occupied by a reflector element. In some examples, instead of moving a replaced reflector element to an unfilled location, the reflector element can be removed from the core.

Figure 12:
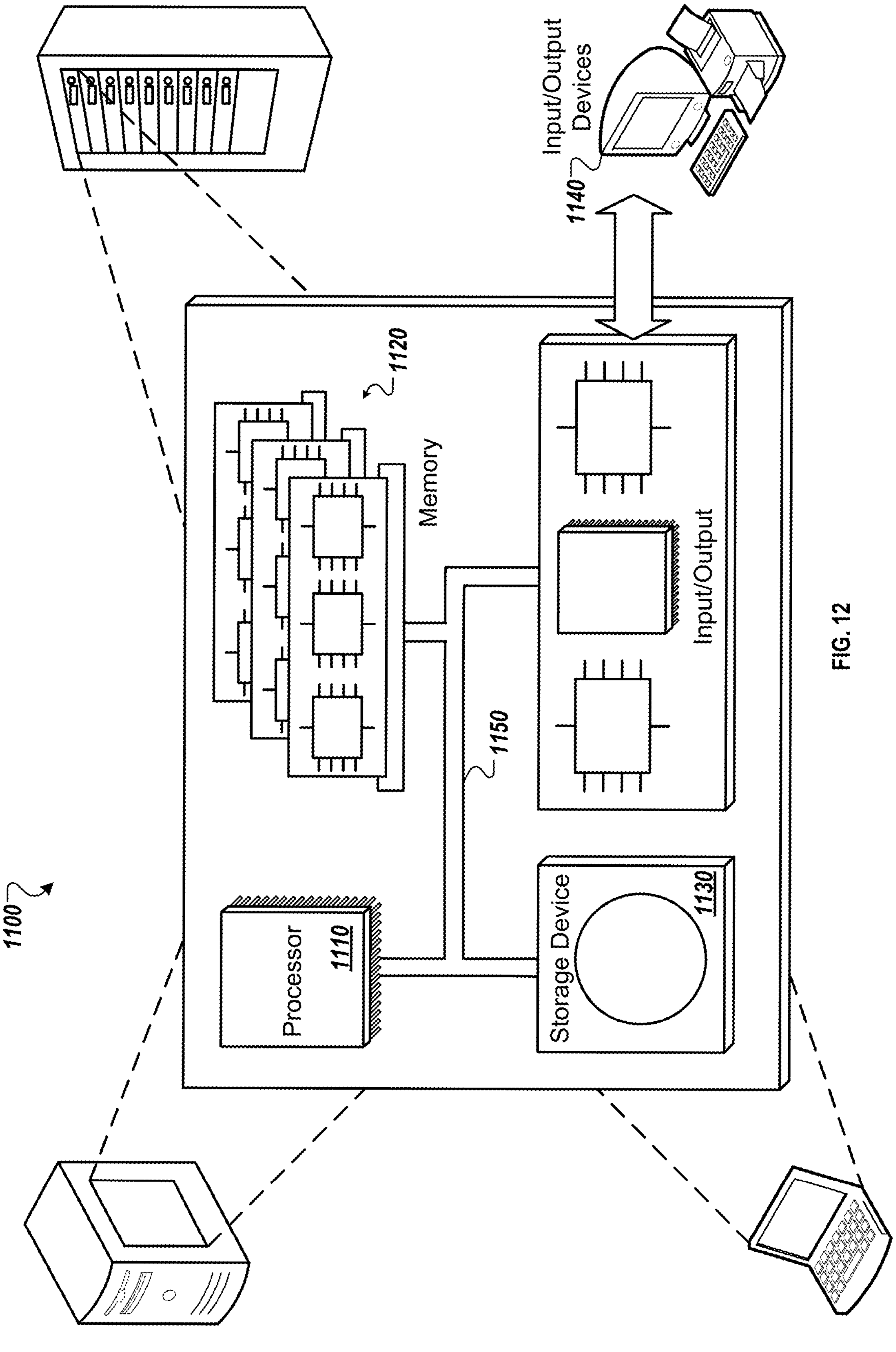
FIG. 12 is a schematic diagram of a computer system in accordance with implementations of the present disclosure.

FIG. 12 is a schematic diagram of a computer system 1100. The system 1100 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 1100) and their structural equivalents, or in combinations of one or more of them. The system 1100 is intended to include various forms of digital computers, such as laptops, desktops, workstations, personal digital assistants, servers, blade servers, mainframes, and other appropriate computers, including vehicles installed on base units or pod units of modular vehicles. The system 1100 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. The processor may be designed using any of a number of architectures. For example, the processor 1110 may be a CISC (Complex Instruction Set Computers) processor, a RISC (Reduced Instruction Set Computer) processor, or a MISC (Minimal Instruction Set Computer) processor.

In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The power plant, including the reactor may be controlled using automatic control mechanisms that leverage compiler advancements to allow the training of system controllers, e.g., the processor 1110, to better simulate controls maneuvers all from the same program. Automatic differentiation capabilities for use in machine learning techniques may be used to create differentiable programs where derivatives can be taken through complex code with loops, branches, and other structures. Various tools are connected to a compiler to create compiled derivative versions of a function so that derivative method f(x) for arbitrarily complex f(x) can be efficiently compiled.

This can be used to compute sensitivity studies. It can also be used to take derivatives of an arbitrarily complex function with respect to any of its parameters to allow trainable models to be used as part of a differentiable program. A function whose inputs are the current system state and some desired target state are created, and the resulting information is provided to a trainable model, which acts as a controller, and gives interpretable suggestions for controls maneuvers to take the system to the target state. This suggestion and the current system state are used to solve the differential equation to determine what the actual result of those controls maneuvers is. The difference between the results of the differential equation solver and the target state yield a metric for the usefulness of the trainable model of the reactor and power plant.

Automatic differentiation allows for the direct computation of gradients of the loss value with respect to the internal parameters of the controller model. A neural network is an example. The function can be run in a loop and the parameters of the controller updated, thereby minimizing the loss, and improving the quality of controls suggestions coming from the model for the reactor and power plant.

The controller can be trained by letting it repeatedly attempt to get the system to a target state, rather than having to define reward functions, or generate training data of any kind. This reduces reliance on black-box reinforcement learning algorithms in favor of differentiable control methods to achieve faster convergence to more effective controls schemes of the reactor and power plant.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, a tape device, or a solid state device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A system, comprising:

a nuclear reactor, comprising:

- a plurality of nuclear fuel elements; and
- a primary coolant loop configured to transport a liquid metal coolant to receive heat from the plurality of nuclear fuel elements;
- a cladding at least partially enclosing the nuclear fuel elements; and
- a nuclear reactor vessel system, comprising:
  - an inner vessel that defines an inner volume sized to at least partially enclose the nuclear reactor;
  - a pool of immersing fluid that occupies a volume inside the inner vessel;
  - an outer vessel sized to wholly or substantially enclose the inner vessel;
  - a core barrel positioned within the inner vessel;
  - a riser positioned within the inner vessel;
  - a barrier positioned within the inner vessel and enclosing the nuclear reactor, the core barrel, and the riser such that the barrier is submerged in the pool of immersing fluid;
  - a downcomer positioned between the riser and an inner surface of the barrier; and
  - a heat exchanger positioned in the downcomer and configured to transfer heat from the liquid metal coolant to an intermediate coolant or to a power conversion working fluid.

2. The system of claim 1, comprising a cold trap configured to purify the liquid metal coolant, wherein the cold trap is positioned in the primary coolant loop at an outlet of the heat exchanger and is cooled by the intermediate coolant or by a coolant of a passive reactor cooling system.

3. The system of claim 1, comprising a hot trap positioned in the primary coolant loop and configured to purify the liquid metal coolant.

4. The system of claim 1, wherein, during operation at steady-state conditions at power levels ranging from reactor startup to full power, the liquid metal coolant flows through the primary coolant loop by natural circulation.

5. The system of claim 1, comprising:

- a booster pump configured to pump the liquid metal coolant through the primary coolant loop, wherein the booster pump is positioned at one of a heat exchanger outlet, a reactor inlet, or a segment of the primary coolant loop that is external to the outer vessel; and
- a momentum-based circulator positioned at an outlet of the booster pump.

6. The system of claim 1, wherein the pool of immersing fluid is hydraulically isolated from the primary coolant loop.

7. The system of claim 1, comprising a modular package of reactor vessel components wherein the modular package is removable from the system, the modular package comprising a heat exchanger and a pump.

8. The system of claim 1, wherein the pool of immersing fluid is outside the barrier.

9. A system, comprising:

a nuclear reactor, comprising:

- a plurality of nuclear fuel elements; and
- a primary coolant loop configured to transport a liquid metal coolant to receive heat from the plurality of nuclear fuel elements; a cladding at least partially enclosing the nuclear fuel elements; and
- a nuclear reactor vessel system, comprising:
  - an inner vessel that defines an inner volume sized to at least partially enclose the nuclear reactor;

an outer vessel sized to wholly or substantially enclose the inner vessel;

a heat exchanger configured to transfer heat from the liquid metal coolant to an intermediate coolant or to a power conversion working fluid; and a cold trap configured to purify the liquid metal coolant, wherein the cold trap is positioned in the primary coolant loop at an outlet of the heat exchanger and is cooled by the intermediate coolant or by a coolant of a passive reactor cooling system.

* * * * *